March 15, 1932. A. W. McCLARY Re. 18,387

RAIL JOINT

Original Filed Dec. 10, 1928

INVENTOR.
ARCHIE W McCLARY

BY
White, Prest, Flehr & Lothrop
ATTORNEYS.

Reissued Mar. 15, 1932

Re. 18,387

UNITED STATES PATENT OFFICE

ARCHIE W. McCLARY, OF OAKLAND, CALIFORNIA, ASSIGNOR TO WELDING SERVICE INC., OF SAN FRANCISCO, CALIFORNIA, A CORPORATION OF CALIFORNIA

RAIL JOINT

Original No. 1,752,566, dated April 1, 1930, Serial No. 324,856, filed December 10, 1928. Application for reissue filed June 23, 1931. Serial No. 546,397.

This invention relates generally to the construction of joints for the rails of railways.

It is an object of this invention to devise a rail joint construction which will give satisfactory service over relatively long periods of use.

It is a further object of this invention to devise a rail joint construction which will be relatively free from mutilation of the ends of the rails, where the rail ends are in direct abutting contact.

Further objects of the invention will appear from the following description in which I have set forth the preferred embodiment of my invention. It is to be understood that the appended claim is to be accorded a range of equivalents consistent with the state of the prior art.

Referring to the drawings.

The various features of my invention will be made clear from the following detailed description. My joint conforms to conventional construction to the extent that I provide a pair of plates or angle irons 10 for securing together a pair of rails 11 and 12. Each rail consists of the usual ball and flanged portions 13 and 14 respectively, joined by a webbed portion 15.

Figure 3:
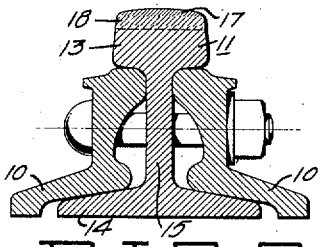
Fig. 3 is a cross sectional view taken along the line 3—3 of Fig. 2.
Figure 4:
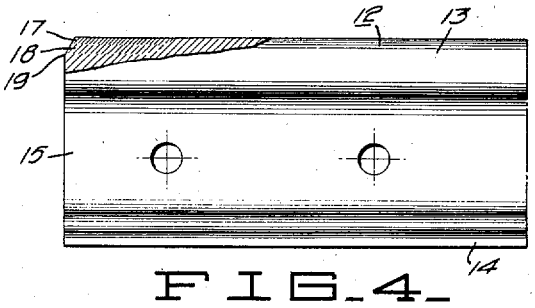
Fig. 4 is a detail of an end portion of one rail, a portion of the ball being shown in cross section.

It has been found that the upper surfaces of the rails near the rail ends, are subject to severe wear and tend to become mutilated after a time, particularly where the ends of the rails are retained in close abutting contact. This is due in part to pounding of the wheels of the rolling stock upon the ends of the rails and to relative movement between the rail ends which tends to chip the adjoining edges. To avoid such mutilation I form the end portion of at least one rail, and preferably both rails, somewhat as shown in Figs. 3 and 4. Thus in this instance I provide a layer 17 of metal which is substantially harder and more durable than the metal of which the rails are constructed. The material forming this layer is preferably some hard metal alloy which is applied by electrical welding. It should have sufficient hardness and wear resisting qualities to enable it to withstand the wear more successfully than the metal of the rails, but should have sufficient ductility to prevent chipping and fracturing under the pounding to which it is subjected. An example of such an alloy is one consisting of chromium, nickel, iron and carbon. Generally the elements necessary to form such an alloy are provided in a coated welding rod, and by striking an arc between this rod and the surface of the rail, a layer of the desired character can be applied. Welding rods for supplying hard alloy metal of this kind are well known in the art and need not be specified in detail.

In applying the hard metal alloy layer 17 referred to above, another layer 18 immediately below the layer 17 is heated to a relatively high temperature, particularly where the layer 17 is applied by electrical welding. When the sub-layer 18 has cooled, it is found to be of substantially greater hardness than the remainder of the rail, due presumably to the nature of its heat treatment. This sub-layer of hard material is an advantage in that it provides a hard foundation for the upper layer 17, thus rendering this upper layer more capable of withstanding severe pounding.

Figure 1:
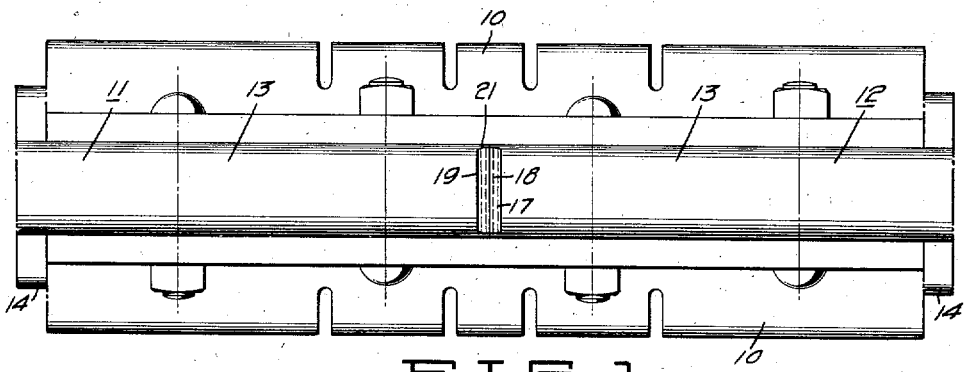
Fig. 1 is a plan view of the joint shown in Fig. 2.
Figure 2:
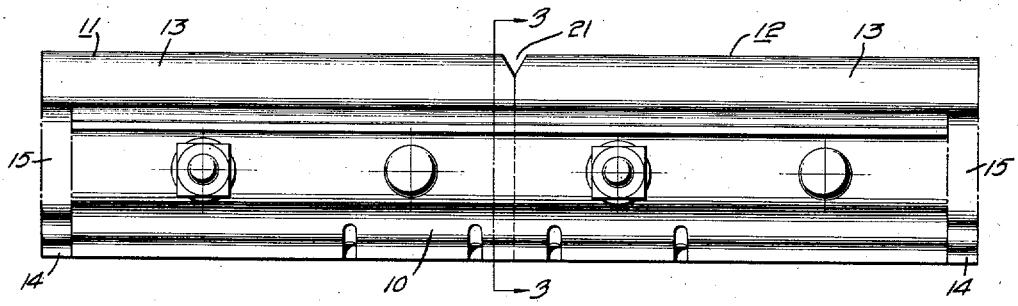
Fig. 2 is a side elevational detail illustrating a rail joint constructed in accordance with my invention.

After the layer 17 of hard metal alloy has been applied, the upper surfaces of the rails are refaced and the upper edge of each rail is then cut back as indicated at 19, as by the use of a suitable grinding machine. This cutting back of the rails is preferably done when the rails are in assembled position as shown in Figs. 1 or 2, and is applied equally to both rails to provide a notch 21. While the dimensions of this notch can vary for different conditions and for different rails, in practice its width at the upper surface of the rails can be about ¼ inch. It is of sufficient depth to at least separate the edges of layers 17 and also preferably to separate the opposed edges of layers 18.

It has been found that such a notch prevents mutilation of the rails and thus materially increases the useful life of the joint. The adjacent edges of the layers 17 and 18 cannot come into direct contact and therefore relative movement between the rails cannot cause these hard layers to be chipped or mutilated. It is also characteristic of my invention that the notch 21 extends down only a minor part of the total depth of the ball portions. Therefore abutting contact is provided not only by the web and flange portions 14 and 15 of each rail, but also by a substantial area of the ball portions. Thus the flanges and webs are not apt to be crushed by excessive compressional stresses due to expansion of the rails.

Although I have shown angle irons for securing the rails together, it is to be understood that the rails can be otherwise connected, as by means of direct welding. Furthermore the rails may be laid so as to have their end faces in abutting contact only when fully expanded.

I claim:

A rail joint comprising a pair of rails having ends adapted to abut, the end faces of the ball portions of said rails being cut away near their upper edges to form a relatively shallow V-shaped notch spacing the tread portions of the rails during wear.

In witness whereof, I have hereunto placed my hand.

ARCHIE W. McCLARY.